(12) United States Patent
Astle et al.

(10) Patent No.: US 11,944,924 B2
(45) Date of Patent: Apr. 2, 2024

(54) FILTER INTERCONNECT USING A MAGNETIC SHEAR FORCE

(71) Applicant: KX Technologies LLC, West Haven, CT (US)

(72) Inventors: Robert Astle, Middlefield, CT (US); Matthew W. Hartmann, Evansville, IN (US)

(73) Assignee: KX TECHNOLOGIES LLC, West Haven, CT (US)

(*) Notice: Subject to any disclaimer, the term of this patent is extended or adjusted under 35 U.S.C. 154(b) by 30 days.

(21) Appl. No.: 17/241,332

(22) Filed: Apr. 27, 2021

(65) Prior Publication Data

US 2021/0331103 A1    Oct. 28, 2021

Related U.S. Application Data

(60) Provisional application No. 63/015,840, filed on Apr. 27, 2020.

(51) Int. Cl.
*B01D 35/30* (2006.01)
*B01D 35/147* (2006.01)
*B01D 35/157* (2006.01)

(52) U.S. Cl.
CPC ........... *B01D 35/30* (2013.01); *B01D 35/147* (2013.01); *B01D 35/1573* (2013.01);
(Continued)

(58) Field of Classification Search
CPC .. B01D 35/30; B01D 35/147; B01D 35/1573; B01D 2201/29; B01D 2201/302;
(Continued)

(56) References Cited

U.S. PATENT DOCUMENTS 3,420,266 A    1/1969  Downey
3,521,216 A    7/1970  Tolegian et al.
(Continued)

FOREIGN PATENT DOCUMENTS

CN    204099679    1/2015
EP    2438601      3/2017

OTHER PUBLICATIONS http://www.polymagnet.com/media/Polymagnet-White-Paper-3-Smart-Magnets-for-Precision-Alignment.

*Primary Examiner* — Madeline Gonzalez
(74) *Attorney, Agent, or Firm* — DeLio Peterson & Curcio LLC; Brian G. Schlosser (57) ABSTRACT

An interconnection scheme between a filter cartridge and its corresponding manifold whereby a magnetic shear force is introduced to remove a blocking mechanism that would otherwise prohibit attachment. The magnetic shear force may also be employed to activate or deactivate a switch or valve, or engage or disengage an engagement mechanism relative to other components upon interconnection. The magnetic shear force is generated by complementary correlated magnet structures moved into close proximity to one another. The interconnection scheme may be a linear or rotational attachment of the filter cartridge with respect to the manifold. A valve assembly utilizing magnetic shear force may be employed to activate a bypass action between a manifold ingress port and egress port, thereby allowing water to flow when a filter cartridge is removed from the manifold and directing water to the filter cartridge when the valve assembly is activated.

9 Claims, 9 Drawing Sheets

(52) U.S. Cl.
CPC .... *B01D 2201/29* (2013.01); *B01D 2201/302* (2013.01); *B01D 2201/4053* (2013.01); *B01D 2201/4061* (2013.01); *B01D 2201/4069* (2013.01); *B01D 2201/4092* (2013.01)

(58) Field of Classification Search
CPC .... B01D 2201/4053; B01D 2201/4061; B01D 2201/4069; B01D 2201/4092; B01D 2201/4015; B01D 29/96
USPC ....... 210/234, 222, 167.29, 450, 493.2, 232, 210/455
See application file for complete search history.

(56) References Cited

U.S. PATENT DOCUMENTS

| | | | |
|---|---|---|---|
| 4,468,321 A | 8/1984 | St. John | |
| 5,527,450 A | 6/1996 | Burrows | |
| 6,003,734 A | 12/1999 | Oh | |
| 7,800,471 B2 | 9/2010 | Fullerton et al. | |
| 7,800,473 B2 | 9/2010 | Fullerton et al. | |
| 7,808,348 B2 | 10/2010 | Fullerton et al. | |
| 7,808,349 B2 | 10/2010 | Fullerton et al. | |
| 7,808,350 B2 | 10/2010 | Fullerton et al. | |
| 7,817,006 B2 | 10/2010 | Fullerton et al. | |
| 7,893,803 B2 | 2/2011 | Fullerton et al. | |
| 8,098,122 B2 | 1/2012 | Fullerton et al. | |
| 8,279,032 B1 | 10/2012 | Fullerton et al. | |
| 8,314,671 B2 | 11/2012 | Fullerton et al. | |
| 8,314,672 B2 | 11/2012 | Fullerton et al. | |
| 8,461,952 B1 | 6/2013 | Fullerton et al. | |
| 8,570,129 B2 | 10/2013 | Fullerton | |
| 8,760,252 B2 | 6/2014 | Fullerton et al. | |
| 8,872,608 B2 | 10/2014 | Fullerton et al. | |
| 8,963,668 B2 | 2/2015 | Fullerton et al. | |
| 9,233,322 B1 | 1/2016 | Huda | |
| 10,129,667 B2 | 11/2018 | Gustafsson | |
| 10,173,292 B2 | 1/2019 | Fullerton et al. | |
| 2003/0042191 A1 | 6/2003 | Nam et al. | |
| 2008/0179236 A1* | 7/2008 | Wieczorek | F02M 37/42 210/235 |
| 2010/0140521 A1 | 6/2010 | Burgess et al. | |
| 2010/0212259 A1 | 8/2010 | Knieling et al. | |
| 2010/0264078 A1 | 10/2010 | Bassett | |
| 2011/0114862 A1 | 5/2011 | Zimmerman et al. | |
| 2012/0229241 A1 | 9/2012 | Fullerton et al. | |
| 2013/0068673 A1 | 3/2013 | Maggiore et al. | |
| 2013/0240431 A1 | 9/2013 | Foix et al. | |
| 2016/0194229 A1 | 7/2016 | Mehdi | |
| 2017/0072347 A1 | 3/2017 | Schmoll | |
| 2017/0259196 A1 | 9/2017 | Foix et al. | |
| 2018/0111129 A1 | 4/2018 | Adey et al. | |
| 2018/0221795 A1 | 8/2018 | Bonifas et al. | |
| 2018/0245429 A1 | 8/2018 | Bhadbjade | |
| 2019/0039005 A1 | 2/2019 | Suthar et al. | |
| 2019/0351352 A1 | 11/2019 | Chandra et al. | |
| 2019/0351354 A1 | 11/2019 | Chandra et al. | |
| 2020/0001211 A1* | 1/2020 | Li | B01D 35/1573 |

* cited by examiner

FILTER INTERCONNECT USING A MAGNETIC SHEAR FORCE

BACKGROUND OF THE INVENTION

1. Field of the Invention

The present invention relates to the interconnection schemes between a filter cartridge and its corresponding manifold whereby, in general, a magnetic shear force is introduced to remove a blocking mechanism that would otherwise prohibit attachment. The magnetic shear force may also be employed to activate or deactivate a switch or valve, or engage or disengage an engagement mechanism relative to other components upon interconnection.

2. Description of Related Art

Correlated magnet designs were introduced in U.S. Pat. No. 7,800,471 issued to Correlated Magnetics Research, LLC on Sep. 21, 2010, titled "FIELD EMISSION SYSTEM AND METHOD" (the "'471 Patent"). This patent describes field emission structures having electric or magnetic field sources. The magnitudes, polarities, directionality, and positions of the magnetic or electric field sources are configured to have desirable correlation properties, which are in accordance with a predetermined code. The correlation properties correspond to a special force function where spatial forces correspond to relative alignment, separation distance, and a spatial force function.

In U.S. Pat. No. 7,817,006, issued to Cedar Ridge Research LLC on Oct. 19, 2010, titled "APPARATUS AND METHODS RELATING TO PRECISION ATTACHMENTS BETWEEN FIRST AND SECOND COMPONENTS" (a related patent to the '471 Patent), an attachment scheme between first and second components is taught. Generally, a first component includes a first field emission structure and the second component includes a second field emission structure, wherein each field emission structure includes multiple magnetic field emission sources (magnetic array) having positions and polarities relating to a predefined spatial force function that corresponds to a predetermined alignment of the field emission structures. The components are adapted to be attached to each other when the first field emission structure is in proximity of the second field emission structure.

When correlated magnets are brought into alignment with complementary or mirror image counterparts, the various magnetic field emission sources that make up each correlated magnet will align causing a peak spatial attraction force, while a misalignment will cause the various magnetic field emission sources to substantially cancel each other out. The spatial forces (attraction, repulsion) have a magnitude that is a function of the relative alignment of two magnetic field emission structures, the magnetic field strengths, and their various polarities.

Figure 1:
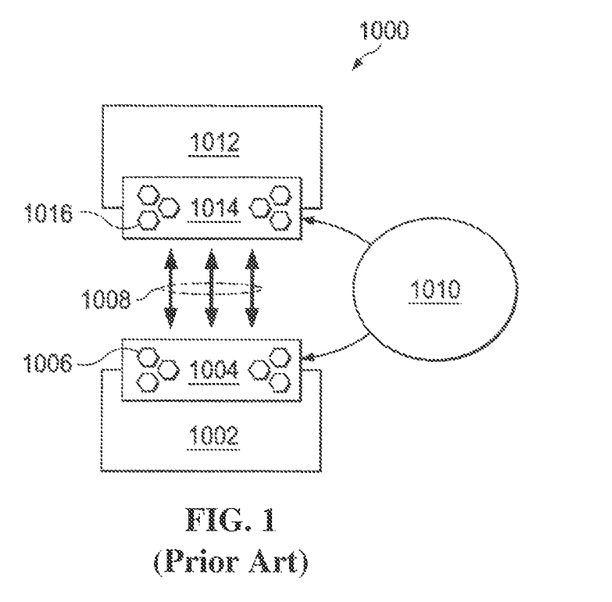
FIG. 1 depicts an apparatus of the prior art representing a code without requiring a holding mechanism to prevent magnetic forces from "flipping" a magnet.

It is possible for the polarity of individual magnet sources to be varied in accordance with a code without requiring a holding mechanism to prevent magnetic forces from "flipping" a magnet. As an illustrious example of this magnetic action, an apparatus 1000 of the prior art is depicted in FIG. 1. Apparatus 1000 includes a first component 1002 and a second component 1012. The first component includes a first field emission structure 1004 comprising multiple field emission sources 1006. The second component includes a second field emission structure 1014 comprising multiple field emission sources 1016. The first and second components are adapted to attach to one another when the first field emission structure 1004 is in proximity of the second field emission structure 1014, that is, they are in a predetermined alignment with respect to one another.

The first field emission structure 1004 may be configured to interact with the second field emission structure 1014 such that the second component 1012 can be aligned to become attached (attracted) to the first component 1002 or misaligned to become removed (repulsed) from the first component. The first component 1002 can be released from the second component 1012 when their respective first and second field emission structures 1004 and 1014 are moved with respect to one another to become misaligned.

Generally, the precision within which two or more field emission structures tend to align increases as the number N of different field emission sources in each field emission structure increases, including for a given surface area A. In other words, alignment precision may be increased by increasing the number N of field emission sources forming two field emission structures. More specifically, alignment precision may be increased by increasing the number N of field emission sources included within a given surface area A.

In U.S. Pat. No. 7,893,803 issued to Cedar Ridge Research on Feb. 22, 2011, titled "CORRELATED MAGNETIC COUPLING DEVICE AND METHOD FOR USING THE CORRELATED COUPLING DEVICE," a compressed gas system component coupling device is taught that uses the correlated magnet attachment scheme discussed above.

Figure 2:
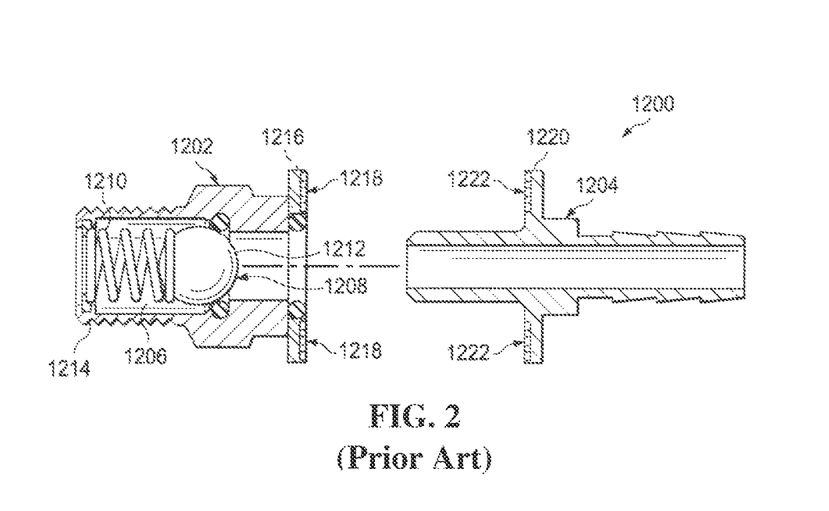
FIG. 2 depicts a coupling device of a compressed gas system component that uses a correlated magnet attachment scheme.

An illustrious example of this coupling device is shown in FIG. 2, which depicts a quick connect air hose coupling 1200 having a female element 1202 and a male element 1204.

The female element 1202 includes a first magnetic field emission structure 1218. The male element 1204 includes a second magnetic field emission structure 1222. Both magnetic field emission structures are generally planar and are in accordance with the same code but are a mirror image of one another. The operable coupling and sealing of the connector components 1202, 1204 is accomplished with sufficient force to facilitate a substantially airtight seal therebetween.

The removal or separation of the male element 1204 from the female element 1202 is accomplished by separating the attached first and second field emission structures 1218 and 1222. The male element is released when the male element is rotated with respect to the female element, which in turn misaligns the first and second magnetic field emission structures.

A description of the precision alignments of polymagnets can be found at:
http://www.polymagnet.com/media/Polymagnet-White-Paper-3-Smart-Magnets-for-Precision-Alignment.pdf.

The present invention adapts the correlated magnet technology described above to an interconnection structure for a filter cartridge and a corresponding manifold. It utilizes the shear force generated by the placement of two correlated magnets against each other, initiating a translation motion perpendicular to the direction of attachment between the magnets.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-17 of the drawings in which like numerals refer to like features of the invention.

Correlated magnets contain areas of alternating poles. These codes of alternating poles can concentrate and/or shape magnetic fields to give matching pairs of magnets unique properties. The proposed design specifically uses a complementary correlated magnet pair in a filter cartridge/manifold attachment or interconnect system.

The present invention utilizes correlated magnet designs with "high auto-correlation and low cross-correlation" which is a characteristic of correlated magnets where peak efficacy is achieved (magnet attraction or repulsion) when paired with a specific complementary magnet. An example of such use of correlated magnets is disclosed in U.S. Pat. No. 8,314,671 issued to Correlated Magnets Research LLC on Nov. 20, 2012, titled "KEY SYSTEM FOR ENABLING OPERATION OF A DEVICE." Correlated magnets are also characterized by dense and tunable magnetic fields, allowing for specifically engineered force curves with higher force at shorter working distances.

Figure 17:
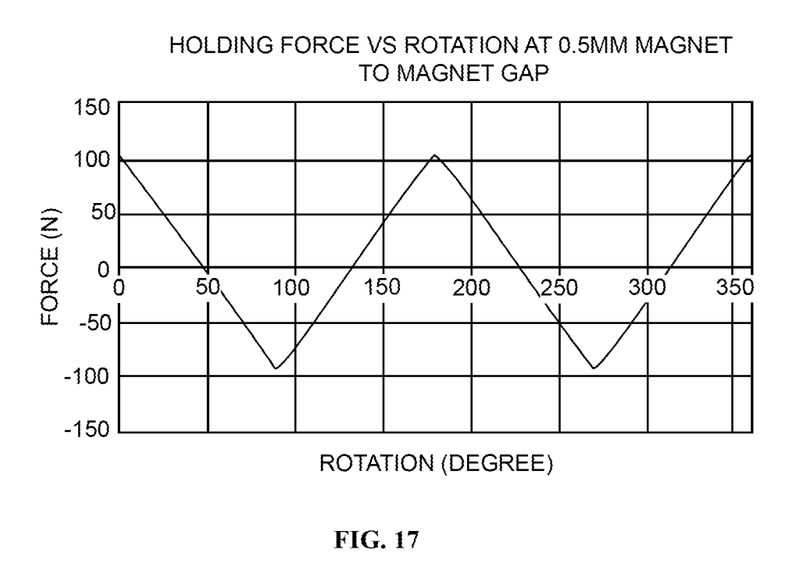
FIG. 17 illustrates a graph of varying magnetic forces of correlated magnets that depend on the relative rotational orientation of a pair of magnets (e.g., repulsion-attraction-repulsion-attraction at 90 degree intervals).

In addition, correlated magnets can be designed to have varying magnetic forces depending on the relative rotational orientation of the pair of magnets (e.g., repulsion-attraction-repulsion-attraction at 90-degree intervals) as illustrated in the Graph of FIG. 17.

Integral to the design is a matching set of "keyed" correlated magnets disposed in/on the filter cartridge housing and manifold, respectively, which provide the initial drive to engage functions through non-electric and non-contacting actuation. As discussed further herein, the embodiments of the present invention illustrate the actuation of a blocking mechanism that allows for the attachment of a filter cartridge to a manifold, and may include the actuation of a valve for water flow when the filter cartridge is secured to the manifold, or the engagement of other mechanisms upon interconnection; however, it should be understood by those skilled in the art that these types of actuations are only examples of how a magnetic shear force mechanism can be implemented, and that other magnetic shear force applications to secure a filter cartridge to a manifold are not precluded.

The present invention utilizes a magnetic design that encompasses correlated magnets. The function of the correlated magnets in this application is twofold. First, a filter cartridge having a correlated magnet is inserted within a receiving manifold having a complementary correlated magnet. The magnets are complementary in the sense that they are designed to work together under magnetic communication to initiate a desired magnetic force. At some point during the interconnection, either during filter cartridge insertion or rotation within the manifold, a desired, predetermined magnetic shear force is generated that causes translation of a movable component or structure having an attached complementary correlated magnet in a direction different from (and in most instances perpendicular to) the direction of rotation or insertion. Second, the magnetic shear force introduced by the rotation or insertion of the filter cartridge acts upon a blocking mechanism, a valve or switch, or an engagement mechanism. In the case of a blocking mechanism, the blocking device is moved, allowing for continued insertion or rotation of the filter cartridge into proper position and initiate water flow, and conversely the blocking device is repositioned under magnetic force back to its initial position during extraction of the filter cartridge.

As noted above, a magnetic shear force is generated by a complementary pair of correlated magnets, and applied to a filter interconnection system, which allows for a higher degree of control and flexibility over the timing, attachment, and actuation of critical components and system functions.

In order to generate a magnetic shear force, the filter cartridge/manifold apparatus introduces a poly magnet or correlated magnet, which can be identified as a first magnetic structure comprising a first set of predefined tracks of magnetic sources magnetically printed into a first magnetizable material which is brought into physical proximity of a second complementary magnetic structure comprising a second set of predefined tracks of magnetic sources magnetically printed into a second magnetizable material.

Figure 3:
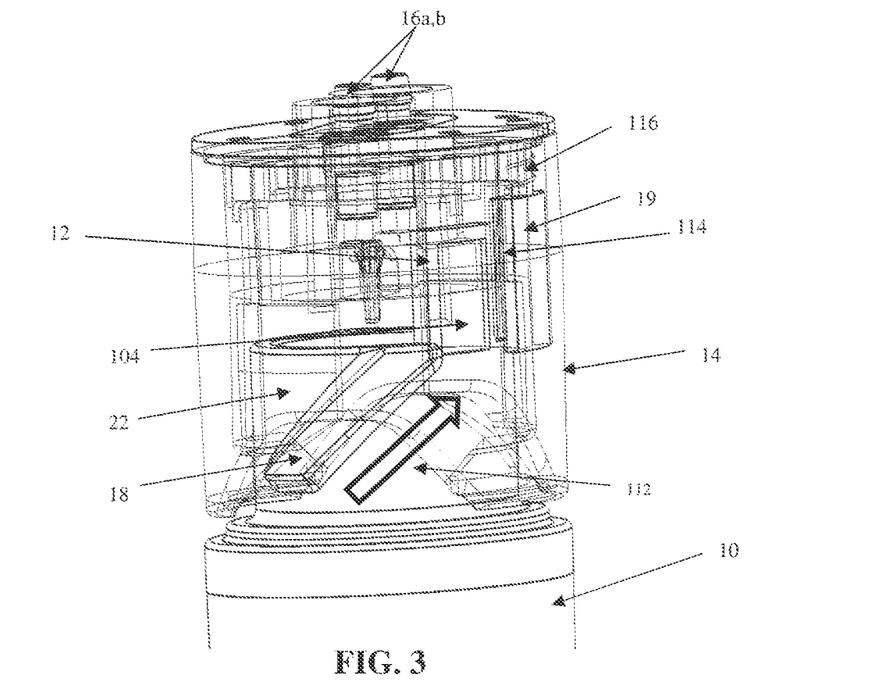
FIG. 3 depicts a transparent, perspective view of a filter cartridge—manifold combination using magnetic shear force to remove a block structure that would otherwise prohibit complete rotation.

In one embodiment, a magnetic shear force is generated by the rotation of a first magnetic structure mounted on the filter cartridge, which is rotated into close proximity to a second magnetic structure which is in a fixed position on the manifold. FIG. 3 shows one such embodiment of the present invention.

FIG. 3 depicts a transparent, perspective view of a filter cartridge—manifold combination using magnetic shear force to remove a block structure that would otherwise prohibit complete rotation. In this embodiment, filter cartridge 10 includes an annular collar 22 with securing lugs or threads 18 (angled with respect to a center axis of the filter cartridge) and a tab 12 supporting a first magnetic structure. (Although a tab is depicted, other structural members may be used to hold the filter cartridge fixed "first" magnetic structure.)

The filter cartridge is designed to be insertable within manifold 14 having a movable blocking structure 19 which may include or hold a complementary second magnetic structure 114, which in turn may include or hold a magnet 115. Manifold 14 has water ingress and egress ports 16a,b in which the ingress port permits incoming water to be received by the manifold and flow into filter cartridge 10, and the egress port receives filtered water from the filter cartridge. Lugs or threads 18 secure filter cartridge 10 to manifold 14 upon rotation. In an alternate embodiment, a locking mechanism may also be employed to secure further the filter cartridge from reverse rotation.

As depicted in FIG. 3, lugs or threads 18 are shown extending radially outwards from an outside wall of annular collar 22. It is also possible to have receiving apertures and/or receiving threaded grooves on the outside wall of the annular collar 22 to receive lugs or threads on the manifold. Tab 12 is shown extending axially upwards from annular collar 22 and radially outwards at least less than the radial extension of lugs 18, and preferably no further radially outwards than the outside wall of annular collar 22, such that tab 12 does not interfere with the rotation of the filter cartridge within the receiving manifold. It is also possible for tab 12 to be form-fit within the annular collar or on the inside wall of the annular collar and it need not extend axially upwards from the annular collar. The necessary condition for attachment is that there be magnetic communication between the magnet 104 located on the filter cartridge (shown in FIG. 3 within tab 12) and the complementary, movable magnet located on the manifold.

Figure 4:
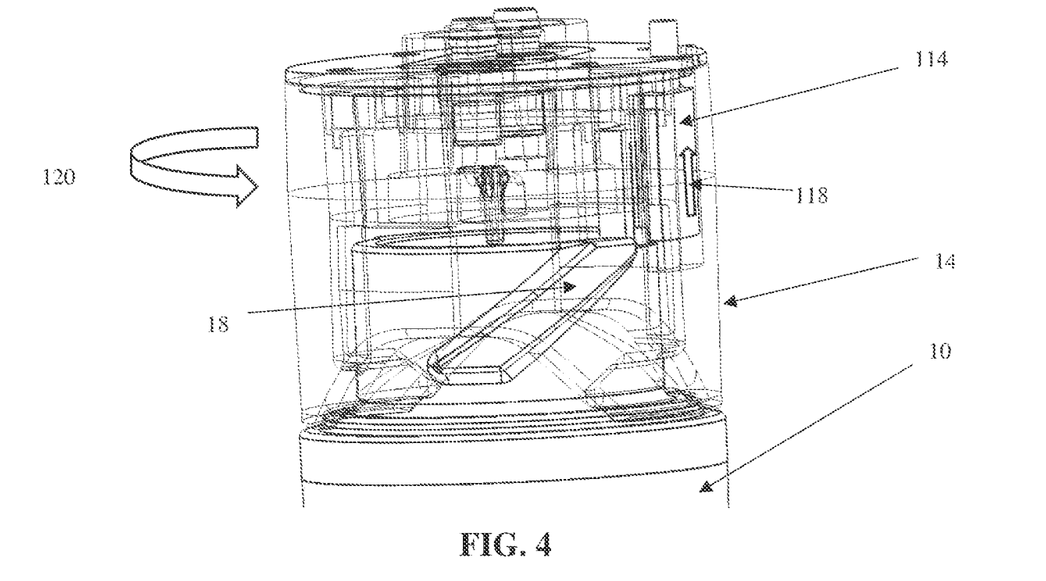
FIG. 4 depicts a transparent, perspective view of the filter cartridge—manifold housing combination of FIG. 3 when the first magnetic structure is aligned with a second magnetic structure.

In the embodiment depicted in FIG. 3, filter cartridge 10 is rotated into manifold 14. Lugs or threads 18 include at least a portion of one or more upwardly angled segments, which upon rotation serve to raise the filter cartridge within the manifold as the filter is lifted in the direction of arrow 112 when rotated in the direction of arrow 120 (FIG. 4). A first magnetic structure 104 is secured to the filter cartridge, shown in exemplary embodiment by tab 12, which extends axially upwards from annular collar 22.

During rotation, first magnetic structure 104 comes in close proximity to second magnetic structure 114 supported by manifold 14. Second magnetic structure 114 acts as a blocking member that blocks rotation of filter cartridge 10 by interfering with the path of angled lugs or threads 18 until first magnetic structure 104 is moved into close proximity to second magnetic structure 114. A magnet 115 may be attached to or embedded within second magnetic structure 114. Conversely, magnet 115 may be directly attached to or embedded within blocking member 19.

In the embodiment of FIG. 3, blocking member 19 and second magnetic structure 114 are biased axially downwards by resilient spring 116. Once the magnetic structures are in close proximity, the magnet 115 in the second magnetic structure undergoes a magnetic shear force that overcomes the resilient force provided by spring 116, and the blocking member is moved axially upwards, clearing a path for the topmost portion of lugs 18 to complete the rotation of filter cartridge 10.

FIG. 4 depicts a transparent, perspective view of the filter cartridge—manifold housing combination when the first magnetic structure 104 is aligned with the second magnetic structure 114. As shown, blocking member 19 and second magnetic structure 114 are lifted (from the original position) in the direction of arrow 118, allowing for further rotational motion of the filter cartridge in the direction of arrow 120 because the removal of the blocking member allows the topmost portion of lug 18 to continue to follow through on the rotation.

Figure 5A:
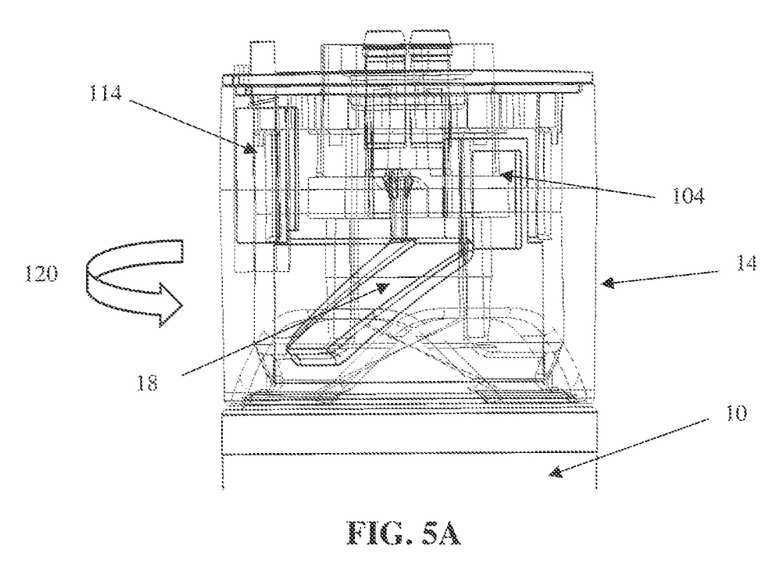
FIG. 5A depicts a transparent, perspective view of the final, inserted position of filter cartridge into manifold housing of the embodiment of FIG. 3.

FIG. 5A depicts a transparent, perspective view of the final, inserted position of filter cartridge 10 into manifold housing 14. Filter cartridge 10 is shown rotated past blocking member and second magnetic structure 114 as a result of the axial upwards magnetic shear force shifting the second magnetic structure 114 upwards, and permitting lugs 18 to continue rotation uninhibited. A locking mechanism may be implemented at this point in rotation so that filter cartridge 10 is prohibited from inadvertent release.

Figure 5B:
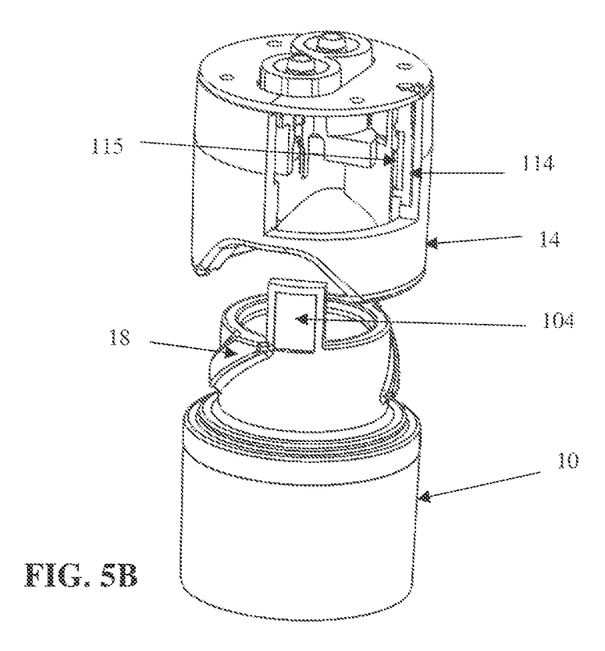
FIG. 5B depicts a perspective view of the final, inserted position of filter cartridge into the manifold housing with a cut-out portion of the manifold showing the internal structure, and a cut-out portion of the second magnetic structure presenting the correlated magnet therein.

FIG. 5B depicts a perspective view of the final, inserted position of filter cartridge 10 into manifold housing 14 with a cut-out portion of the manifold 14 showing the internal structure, and a cut-out portion of the second magnetic structure 114 presenting the correlated magnet 115 therein.

The physical blocking presented by second magnetic structure 114 is removed by the interaction of the two magnetic structures creating an upward shear force, which moves the blocking member against its predisposed resilient downward force.

The physical movement of either magnetic structure may also be used to activate a switch or valve, or otherwise engage an engagement mechanism, capable of initiating another function such as allowing water to flow, activating an electronic signal, or the like. In this manner, the rotation of the filter cartridge causing an axially upwards movement of the second magnetic structure may perform more than the defeating of a blocking mechanism.

In a second embodiment, the interaction of first and second magnetic structures are demonstrated to move a second magnetic structure blocking mechanism in a radial direction away from the center axis so as to allow further rotation of the filter cartridge and/or activate separately or in combination therewith a switch or valve. This configuration is referred to herein as a rotating shear block configuration.

Figure 6:
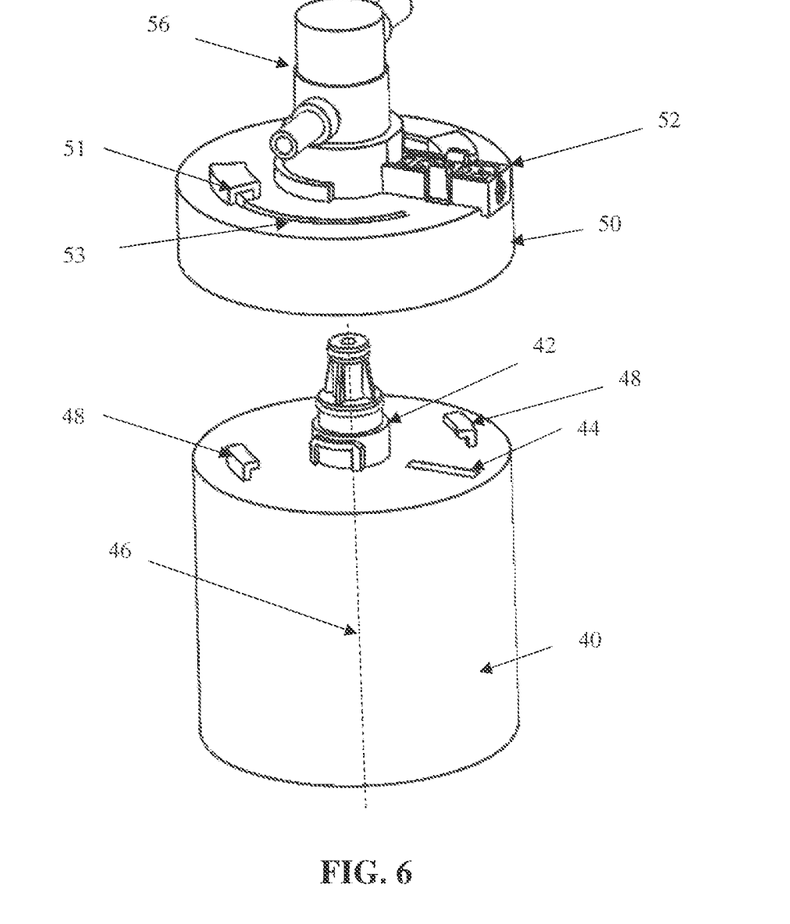
FIG. 6 depicts a prospective view of the salient components of a second embodiment of the present invention, depicting the filter cartridge and manifold, which together perform a rotating magnetic shear force for removing a blocking mechanism.

FIG. 6 depicts a prospective view of the salient components of the rotating shear block configuration design—the filter cartridge top portion and manifold head, which together perform a magnetic shear force for removing a blocking mechanism upon rotation.

As depicted in FIG. 6, a filter cartridge 40 includes an axial stem 42 with ingress/egress ports associated therewith and a first magnetic structure 44 located radially outwards from center axis 46. As discussed further below, locking lugs 48 are used to secure filter cartridge 40 to manifold head housing 50. Other locking members may be utilized, and this present embodiment is not limited to the locking members shown in FIG. 6. The function of the locking lugs/members is to secure the filter cartridge to the manifold head so that inadvertent removal is prohibited. Manifold head housing 50 includes receiving apertures 51 and receiving arcuate slots 53 to assist in attachment of filter cartridge 40. Essentially, receiving apertures 51 receive locking lugs 48, and arcuate slots 53 allow the upwards extending, axial portion of locking lugs 48 to traverse around each slot.

Figure 7:
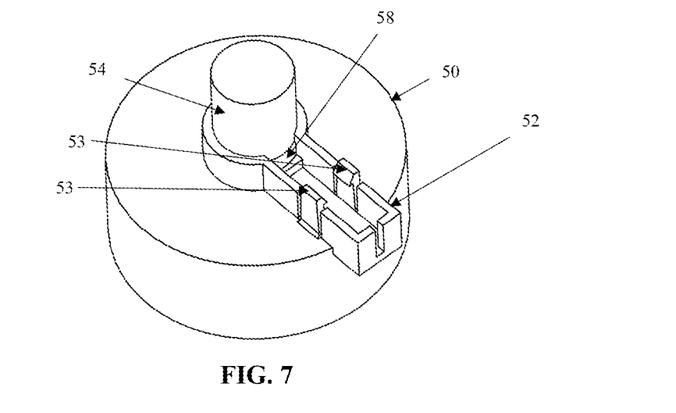
FIG. 7 is a top perspective view of the manifold housing of the embodiment of FIG. 6.

FIG. 7 is a top perspective view of manifold housing 50. Manifold housing 50 is configured with an axial stem 54 which may be used for supporting a valve assembly (not shown). A locking member retention or holder 52 is formed extending radially outwards from axial stem 54. At the junction of axial stem 54 and the radial-most inward portion of locking member retention 52 is an open slot 58. Opposing resilient locking tabs 55 shown with angled faces are configured to receive a movable blocking member 60 in a snap-in fit, securing blocking member 60 within locking member retention 52 while allowing blocking member 60 to translate in directions radially inwards and outwards.

Figure 8:
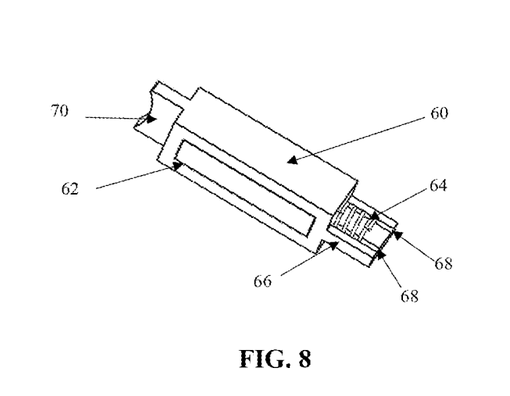
FIG. 8 depicts a bottom perspective view of a locking member of the embodiment of FIG. 6, having a second magnetic structure located on the bottom surface.

FIG. 8 depicts a bottom perspective view of blocking member 60 having a second magnetic structure 62 located on the bottom surface, either attached thereto or embedded therein. Blocking member 60 is secured within locking member retention 52 (See FIG. 7) on the manifold head housing 50. A resilient member 64, such as a spring, provides a radially inwards force to locking member 60 when locking member 60 is inserted within locking member retention 52 (See FIG. 7). Resilient member 64 acts on an inward wall of the radially outward-most side or face of locking member retention 52 (See FIG. 7), such that without an opposing force, locking member 60 is directed towards the manifold slot 58 (See FIG. 7) by resilient member 64.

In the current embodiment, resilient member 64 is supported by slotted protrusion 66, which extends from the body of blocking member 60 in a radially outwards direction when blocking member 60 is placed within locking member retention 52. Protrusion 66 includes parallel slotted apertures 68 for receiving and holding resilient member 64. Other resilient member holders may be utilized without compromising the design configuration. For example, a dowel-shaped protrusion could be used to hold the resilient spring in place, and the present embodiment is not limited to a particular configuration as to how the resilient member can be retained by the blocking member.

On the locking member end opposite protrusion 66 is a locking tab 70. Locking tab 70 is designed to be received by the manifold slot 58 (See FIG. 7) when blocking member 60 is acted upon by resilient member 64, and pushed radially inwards towards axial stem 54 (See FIG. 7).

Figure 9:
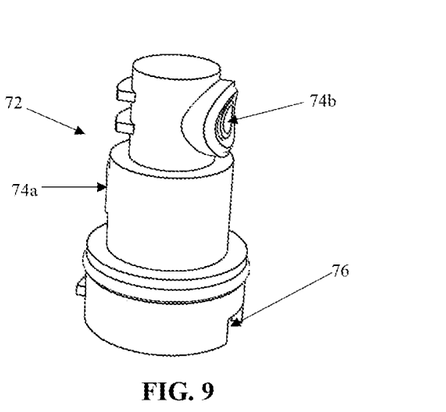
FIG. 9 depicts an embodiment of a valve assembly for use with the embodiment of FIG. 6.

FIG. 9 depicts one embodiment of a valve assembly 72 for the filter cartridge—manifold head configuration depicted in FIGS. 7 and 8. Valve assembly 72 includes ingress and egress ports 74a,b and a notch 76 that is configured to allow valve assembly 72 to be supported by axial stem 54 and seat circumferentially on the filter cartridge housing top surface. Notch 74 is designed to be placed over locking retention member 52.

Figure 10:
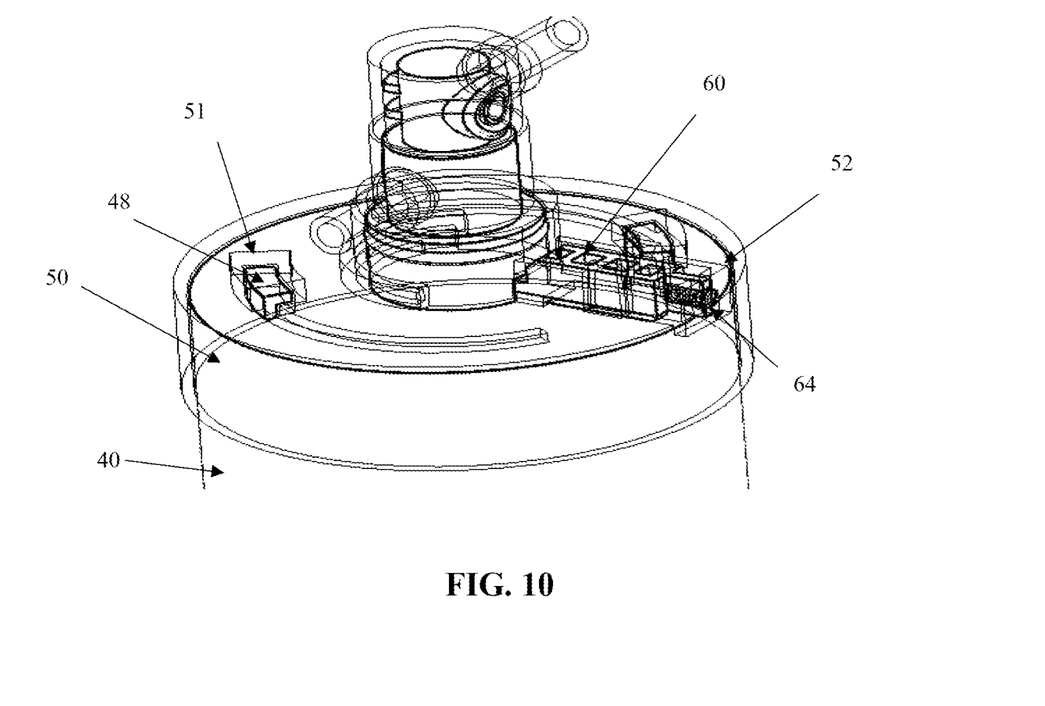
FIG. 10 depicts a transparent, perspective view of a fully inserted filter cartridge within the manifold housing of FIG. 6.

FIG. 10 depicts a transparent, perspective view of a fully inserted filter cartridge 40 within manifold head housing 50. Locking lugs 48 of filter cartridge 40 are inserted within receiving apertures 51. In this position, first and second magnetic structures are aligned so that magnetic communication is initiated. When this occurs, blocking member 60 with second magnetic structure 62 is acted upon by a magnetic shearing force that slides blocking member 60 radially outwards inside locking member retention 52. This action overcomes the radially inwards force of resilient member 64.

Figure 11:
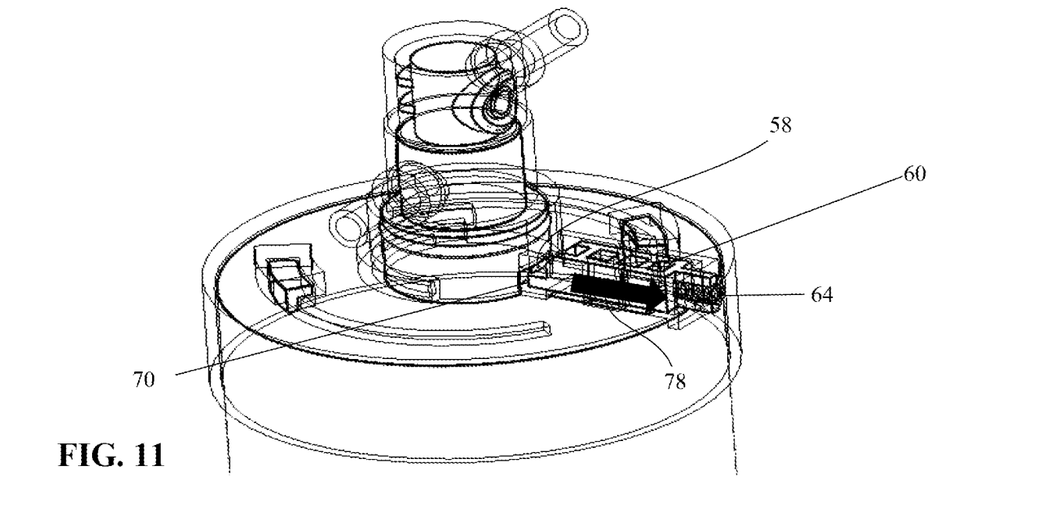
FIG. 11 depicts a transparent, perspective view of the locking member configuration of the embodiment of FIG. 6 when acted upon by a magnetic shearing force in a direction radially outwards.

FIG. 11 depicts a transparent, perspective view of the blocking member 60 configuration when acted upon by a magnetic shearing force in a direction radially outwards, as denoted by arrow 78. Locking tab 70 is removed from slot 58 in this filter cartridge inserted position.

Figure 12:
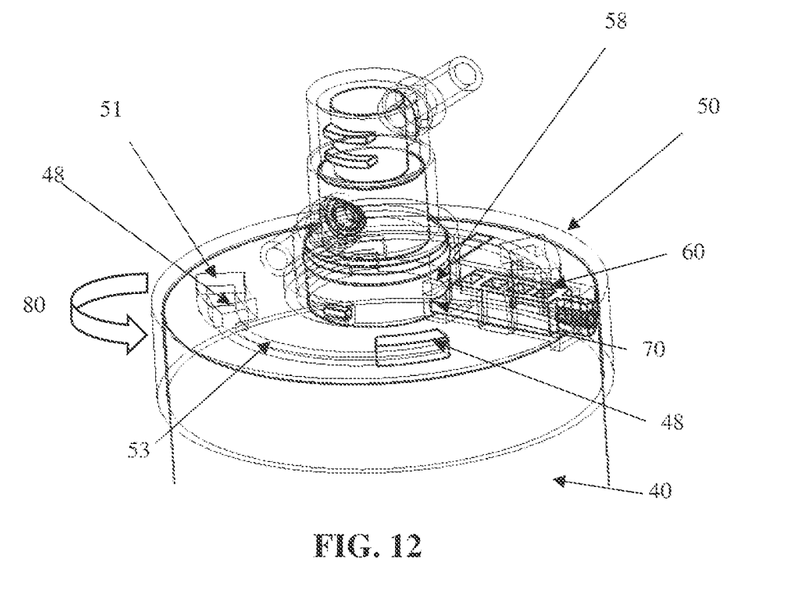
FIG. 12 depicts a transparent, perspective view of filter cartridge of the embodiment of FIG. 6 inserted within, and rotated about, the manifold housing.

With blocking member 60 sheared radially outwards, filter cartridge 40 is allowed to rotate in the direction of arrow 80 (See FIG. 12).

FIG. 12 depicts a transparent, perspective view of filter cartridge 40 inserted within, and rotated about, manifold head housing 50. While locking tab 70 of blocking member 60 is removed from the manifold slot 58, locking lugs 48 are able to rotate through the arcuate path of slots 53 upon rotation of cartridge 40. At the completion of rotation, the filter cartridge is secured in place, and water flows through valve assembly 72 to and from filter cartridge 40.

Magnetic shear forces may also be utilized in a filter cartridge—manifold configuration specifically to activate or engage a valve. As an exemplary embodiment, FIG. 13 depicts an isometric cross-sectional partial view of a filter cartridge housing top portion 200 having a first magnetic structure 202 and ingress/egress ports (one such port shown here as single cylinder 204), being inserted within manifold housing receiving portion 206.

Manifold housing receiving portion 206 includes a complementary port 208a for that receives cylinder 204 of the filter cartridge. (A complementary port 208b is not shown in FIG. 13.) Port 208a includes a water flow channel 210 connected to bypass valve 212. Bypass valve 212 is biased in the open position by resilient spring 214 to allow water to flow through channel 216 without entering (thus, bypassing) the filter cartridge. In this manner, when a filter cartridge is not installed in the manifold housing, a user will still be able to access water.

Figure 13:
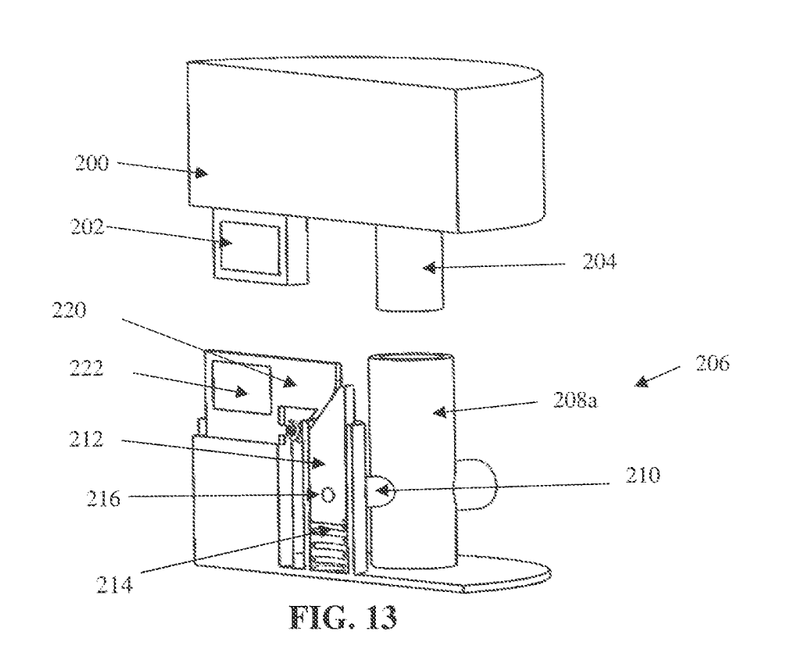
FIG. 13 depicts an isometric cross-sectional partial view of a filter cartridge housing top portion having a first magnetic structure and ingress/egress port, and being inserted within a manifold housing receiving portion.
Figure 14:
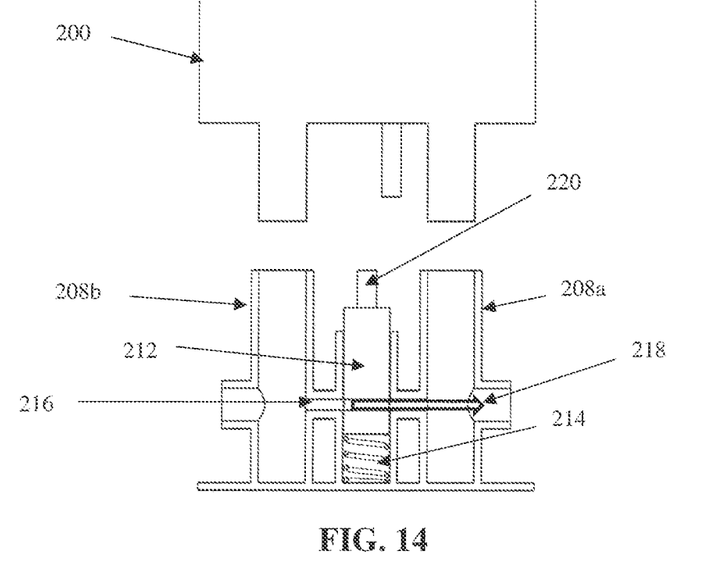
FIG. 14 depicts the filter—manifold combination of FIG. 13 when a valve is in bypass mode, and water flows through a water channel away from, and not directed to, the filter cartridge.

FIG. 14 depicts a cross-sectional view of the filter—manifold combination of FIG. 13 when valve 212 is in bypass mode, and water flows through channel 216 in the direction of arrow 218. At this stage, second magnetic structure 222 held by shear magnet holder 220 is not activated or under any magnetic forces.

Figure 15:
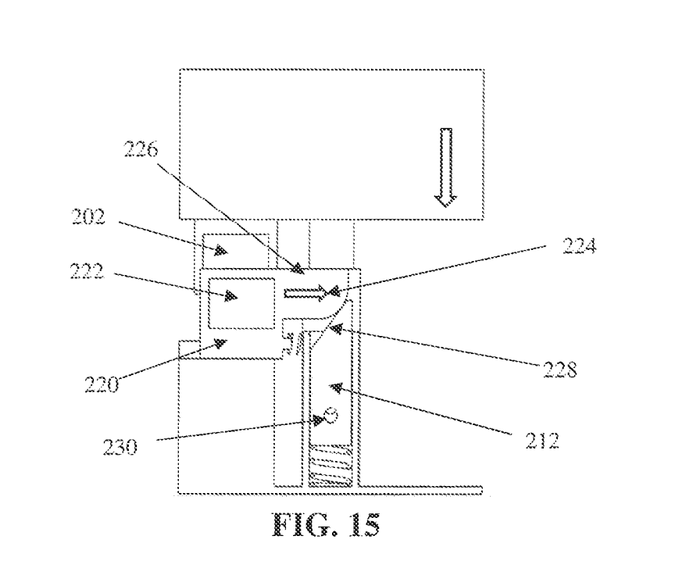
FIG. 15 depicts a cross-sectional view of the filter cartridge—manifold combination of FIG. 13, where the filter cartridge is partially installed and the first and second magnetic structures are in close proximity to one another.

FIG. 15 depicts a cross-sectional view of the filter cartridge—manifold combination of FIG. 13, where the filter cartridge is partially installed and the first and second magnetic structures 202, 222 are in close proximity to one another. Shear magnet holder 220 begins to shift perpendicular to the axial direction of the inserted filter cartridge in the direction of arrow 224. An extended, arcuate projection 226 of shear magnet holder 220 interfaces in a camming fashion with angled face 228 on an exposed end of valve 212. As valve 212 is pushed against resilient spring 214, aperture 230, formed in valve 212, shifts away from channel 216, thus closing channel 216 to water flow. Resilient seals may be provided at the interface of valve 212 with channel 216 to seal the path from water leakage.

Figure 16:
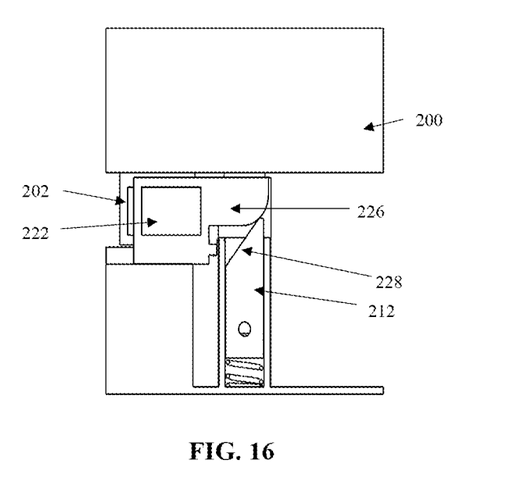
FIG. 16 depicts a cross-sectional view of the filter cartridge—manifold combination of FIG. 13, where the filter cartridge is completely installed and the first and second magnetic structures are in full magnetic communication in which a maximum shear force is applied between them.

FIG. 16 depicts a cross-sectional view of the filter cartridge—manifold combination of FIG. 13, where the filter cartridge is completely installed and the first and second magnetic structures 202, 222 are in full magnetic communication in which a maximum shear force is applied between them.

Water channel 216 is completely cut-off by valve 212, thus directing water through filter cartridge 200. Shear magnet holder 220 is fully shifted at this point, completing its camming function with angled face 228 of valve 212.

In each embodiment above, two separate, complementary magnetic structures are brought in close proximity to one another to induce a magnetic shearing force, where the force is in a direction different to the initial direction of the approaching magnetic structures (generally in a perpendicular direction). In this manner, interfering blocking structures can be displaced to allow complete interconnection, and valves or switches may be activated to perform various related operational functions.

Generally, the method of operation provides for certain salient steps:
  a. Introducing a first component, such as a filter cartridge, having a first magnetic structure, wherein the magnetic structure includes a first set of predefined tracks of magnetic sources magnetically printed into a first magnetizable material;
  b. Introducing a second component, such as a receiving manifold, configured to receive the first component, the second component having a complementary second magnetic structure comprising a second set of predefined tracks of magnetic sources magnetically printed into a second magnetizable material;
  c. Bringing the first and second components in close proximity to one another by moving them closer together in a first direction, such that the first and second magnetic structures are placed in close proximity, generating a magnetic shear force in a second direction different from, and may be perpendicular to, the first direction;
  d. Utilizing the magnetic shear force generated by bringing the first and second magnetic structures in close proximity to one another to displace a blocking component and/or activate a valve or switch; and
  e. Reversing the connection direction to remove the magnetic shear force upon removal and separation of the first component from the second component, thus reintroducing the blocking mechanism, or deactivating the valve or switch.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A filter cartridge for a filtration system, said filter cartridge comprising:
  a housing or sump having a top surface, an axial or longitudinal length, and an internal cavity housing a filter media;
  an ingress port and an egress port in fluid communication with said internal cavity and said filter media; and
  an annular collar circumferentially located about said housing top surface, and having a top rim, an inside wall and an outside wall, said annular collar including securing lugs or threads extending from said annular collar and a tab extending from the top rim in an axial direction;
  said tab including a first magnetic structure and a radially outwardly facing surface that extends no further than said annular collar outside wall or at least no further than a radial extension of said securing lugs or threads;
  wherein said first magnetic structure includes a magnet having N multiple magnetic field emission sources, where N>1, having positions and polarities relating to a predefined spatial force function that corresponds to a predetermined alignment of said magnetic field emission sources.

2. The filter cartridge of claim 1 wherein said magnetic field emission sources of said first magnetic structure are formed in a predetermined fashion to provide a magnetic shear force when brought in close proximity to a complementary second magnetic structure.

3. The filter cartridge of claim 1 wherein said securing lugs or threads extend radially outwards from said annular collar outside wall.

4. A filtration system comprising:
  a filter manifold having ingress and egress fluid ports, and an aperture for receiving a filter cartridge, said filter manifold including a movable blocking mechanism having a first magnetic structure therein or secured thereto, said blocking mechanism movably responsive in a first direction to a magnetic field shear force generated when a complementary second magnetic structure is moved in a second direction approximately perpendicular to said first direction and positioned in close proximity to said first magnetic structure;
  said filter cartridge including:
    a housing or sump having a top surface, an axial or longitudinal length, and an internal cavity;
    an ingress port and an egress port in fluid communication with said internal cavity and said manifold ingress and egress fluid ports when said filter cartridge is connected to said manifold; and
    an annular collar circumferentially located about said housing top surface, and having a top rim, an inside wall, and an outside wall, said annular collar including securing lugs or threads extending from said annular collar and a tab extending from the top rim in an axial direction;
    said tab including the complementary second magnetic structure and having a radially outwardly facing surface that extends no further than said annular collar outside wall or at least no further than a radial extension of said securing lugs or threads;
  wherein said second magnetic structure includes a magnet having N multiple magnetic field emission sources, where N>1, having positions and polarities relating to a predefined spatial force function that corresponds to a predetermined alignment of said magnetic field emission sources;
  wherein, upon attachment of said filter cartridge to said filter manifold, said first and second magnetic structures are brought together in said first direction within close proximity to one another such that said magnetic shear force is generated, which moves said blocking mechanism in said first direction, allow said securing lugs or threads to continue moving in said second direction to complete attachment of said filter cartridge to said filter manifold.

5. The filtration system of claim 4, wherein said first and second magnetic structures each includes a magnet having a plurality of magnetic field emission sources having positions and polarities relating to a predefined spatial force function that corresponds to a predetermined alignment of said magnetic field emission sources.

6. The filtration system of claim 4 wherein said magnetic field emission sources of said first magnetic structure are formed in a predetermined fashion to provide a magnetic shear force when brought in close proximity to said second magnetic structure.

7. The filtration system of claim 4 wherein said filter cartridge is rotatably received by said filter manifold.

8. A filter manifold having ingress and egress fluid ports, and an aperture for receiving the filter cartridge according to claim 1, said filter manifold including a movable blocking mechanism having a second magnetic structure therein, said blocking mechanism movably responsive in a first direction to a magnetic field shear force, said magnetic shear force being generated when the first magnetic structure is moved in a second direction different than said first direction and positioned in close proximity to said second magnetic structure, said second magnetic structure including a magnet having a plurality of magnetic field emission sources having positions and polarities relating to a predefined spatial force function that corresponds to a predetermined alignment of said magnetic field emission sources.

9. The filter cartridge of claim 1 wherein said magnetic structure is located a predetermined distance from an axial center of said top surface.

\* \* \* \* \*